US008260862B2

(12) United States Patent
Chatterjee

(10) Patent No.: US 8,260,862 B2
(45) Date of Patent: Sep. 4, 2012

(54) SYSTEM AND METHOD FOR AUTHENTICATING USERS OF ONLINE SERVICES

(75) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 927 days.

(21) Appl. No.: 11/521,208

(22) Filed: Sep. 14, 2006

(65) Prior Publication Data

US 2008/0072294 A1 Mar. 20, 2008

(51) Int. Cl.
*G06F 15/16* (2006.01)

(52) U.S. Cl. ........ 709/206; 709/225; 713/182; 713/202; 713/170; 379/93.04; 704/273; 434/322

(58) Field of Classification Search .................. 709/206, 709/225; 379/93.04; 713/182, 202, 170; 704/273; 434/322
See application file for complete search history.

(56) References Cited

U.S. PATENT DOCUMENTS

| | | | |
|---|---|---|---|
| 5,280,581 A * | 1/1994 | Bathrick et al. | 709/217 |
| 6,353,852 B1 * | 3/2002 | Nestoriak et al. | 709/206 |
| 6,782,080 B2 * | 8/2004 | Leivo et al. | 379/93.04 |
| 7,336,773 B2 * | 2/2008 | Mittal | 379/88.19 |
| 2002/0147914 A1* | 10/2002 | Arnold | 713/186 |
| 2003/0115142 A1* | 6/2003 | Brickell et al. | 705/51 |
| 2004/0128558 A1* | 7/2004 | Barrett | 713/202 |
| 2004/0249962 A1* | 12/2004 | Lecomte | 709/229 |
| 2005/0175168 A1* | 8/2005 | Summe et al. | 379/266.01 |
| 2005/0268100 A1* | 12/2005 | Gasparini et al. | 713/170 |
| 2005/0273442 A1* | 12/2005 | Bennett et al. | 705/67 |
| 2006/0018445 A1* | 1/2006 | Mittal | 379/88.17 |
| 2006/0041755 A1* | 2/2006 | Pemmaraju | 713/182 |
| 2006/0200487 A1* | 9/2006 | Adelman et al. | 707/102 |
| 2006/0248011 A1* | 11/2006 | Hecht-Nielsen et al. | 705/44 |
| 2007/0026372 A1* | 2/2007 | Huelsbergen | 434/322 |
| 2007/0036283 A1* | 2/2007 | Shaffer et al. | 379/67.1 |
| 2007/0056753 A1* | 3/2007 | Serrano Molina | 169/60 |
| 2007/0106517 A1* | 5/2007 | Cluff et al. | 704/273 |
| 2007/0136573 A1* | 6/2007 | Steinberg | 713/155 |
| 2007/0143475 A1* | 6/2007 | Daigle | 709/225 |
| 2007/0168432 A1* | 7/2007 | Lustgarten et al. | 709/206 |

\* cited by examiner

*Primary Examiner* — Krista Zele
*Assistant Examiner* — James Forman
(74) *Attorney, Agent, or Firm* — Swanson & Bratschun, L.L.C.

(57) ABSTRACT

A method and system for verifying authenticity of an online usage of a user may include sending a message in an electronic communication to an electronic message address of a user, interactively communicating with the user a request for a response including at least a portion of the message sent to the user, and determining if a response to the request from the user matches at least a portion of the message sent to the user. The message may include a personal identification number used for verification. A certification link or authentication code may be provided to the user for posting on a website or within an email. The certification link or authentication code, optionally displaying an indicia, may enable other users to have confidence that the user whose website other users access or whose emails other users receive are authentic and not someone impersonating the user.

21 Claims, 8 Drawing Sheets

| FILE | EDIT | VIEW | FAVORITES | TOOLS | HELP |
|---|---|---|---|---|---|
| BACK | FORWARD | STOP | REFRESH | HOME | SEARCH |

AUTHENTICATION REGISTRATION

NAME: [JOHN SMITH] — 302

* EMAIL ADDRESS: [John_Smith@hotmail.com] — 304  OR  * MOBILE TELEPHONE NUMBER: [ ] — 306

* CARRIER NAME: [Sprint ▽] — 308

* TELEPHONE NUMBER: [800-555-1234] — 310

CALLER ID NAME: [John Smith] — 312

CREDIT CARD NO.: [0123 4567 8910 1234] — 314a  EXP. [09/06] — 314b
(CLICK HERE TO PAY WITH PAY PAL) — 316

DISCOUNT CODE: [ ] — 318

NOTE: DISCOUNT CODE IS PROVIDED BY THIRD PARTY SO THAT CREDIT CARD PAYMENT IS NOT REQUIRED

---

PROFILE INFO: — 320
THIS INFORMATION WILL BE DISPLAYED TO THOSE WHO VIEW YOUR AUTHENTICATION INFORMATION

AGE: [40] — 322
CITY: [DALLAS] — 324
HOME PAGE: [Johnythebrain.com] — 326
PROFESSION: [MATH TEACHER] — 328
COMMENTS: [EISNTEIN ROCKS!] — 330

FIG. 3

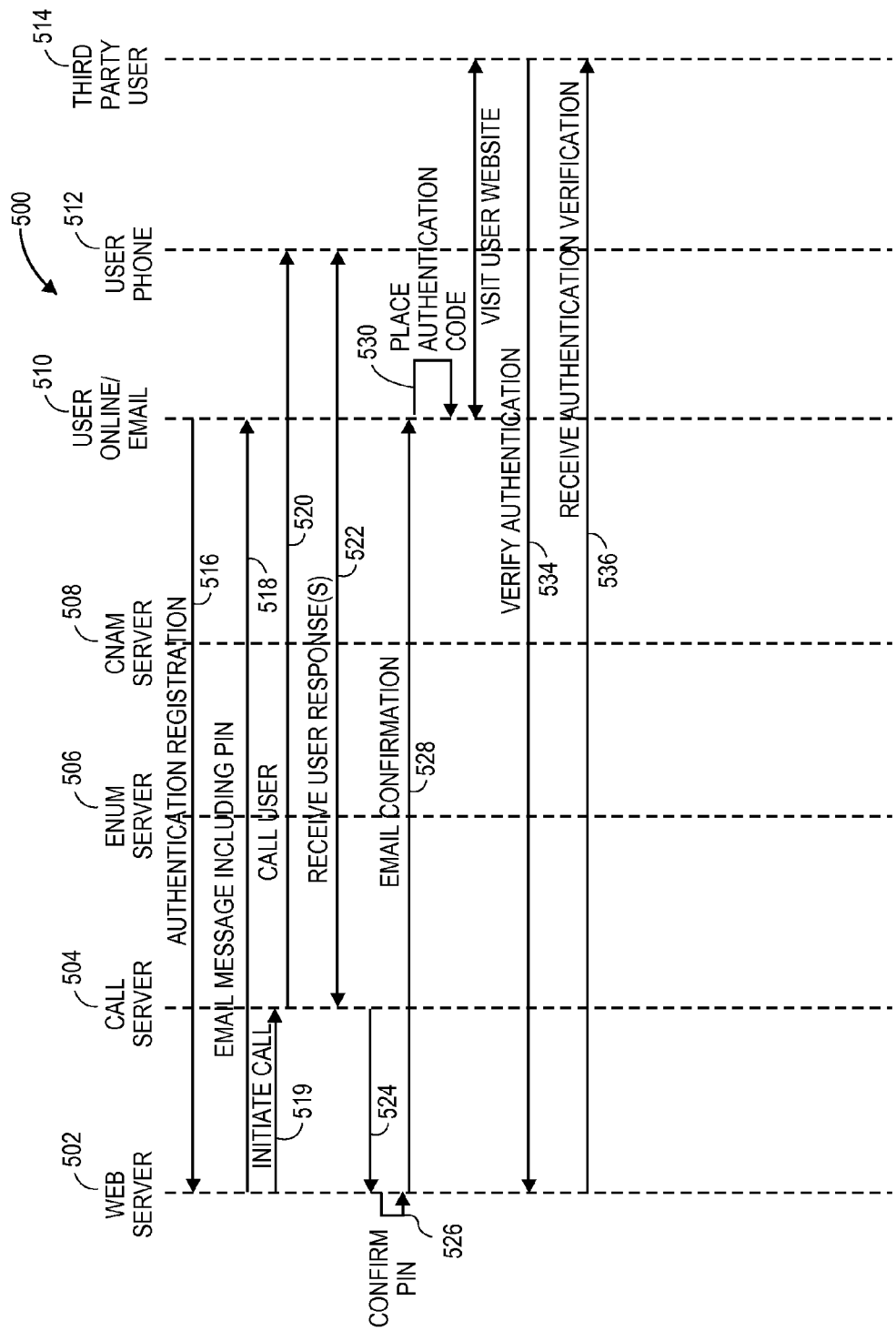

SYSTEM AND METHOD FOR AUTHENTICATING USERS OF ONLINE SERVICES

BACKGROUND

Online communities have become more prevalent in recent years. The online communities have developed into personal websites for individuals to present themselves to others. Social networking websites, such as myspace.com, is one example of an online community. Generally, these personal websites enable other users to interact by posting information and emailing the author of the website.

Problems that have developed in these online communities include identity misrepresentation for fun and mischief. For example, imposters may use another person's name and information to set up a website to misrepresent who the owner of the website actually is to disparage the actual person, embarrass the real person, draw attention to other websites for improper reasons, or other mischievous activity. More specifically, an imposter may set up a webpage and use a famous person's name and likeness (e.g., Tom Cruise), and promote a product, thereby making it look as if the famous person is endorsing the product when, in actuality, the endorsement is fraudulent. While this sort of activity may occur on an online community, it may also occur with other online activities, including websites for businesses. Furthermore, it is possible to create personal and business email accounts having the name of another in the email address so that emails can be sent to others for improper purposes (e.g., billclinton@hotmail.com).

A number of online applications have developed solutions to try and minimize the ability for online fraud to occur. One such online application is PAYPAL®, which is an online payment system. To verify a user or depositor has a bank account, the PAYPAL® online banking system requires that a user provides information for a real world bank account and the PAYPAL® online banking system deposits a small amount of money into the real world bank account and requires that the customer verify that the money is deposited.

Another online application called emigrantdirect.com, has customers fill out a form that provides a real world bank account. The emigrantdirect.com online banking system deposits two small amounts of money into the bank account and then the customer verifies the amounts that were deposited.

Another online application, ticketmaster.com, verifies that a user is human and not a web robot or web-bot. This system presents an image with a word and asks for the user to type in the word being displayed in the image. This type of system verifies that a human is using the website, but it does not authenticate who that user is.

While the above systems are helpful in ensuring that users of systems are human and have bank accounts, they fail to fully address authentication of users to avoid identity fraud by online community users.

SUMMARY

To overcome the problems of online identity fraud, the principals of the present invention provide for a system and method for authenticating users of online services associating an electronic message address with an interactive communication address. In one embodiment, the electronic message address is an email account and an interactive communication address is a telephone number.

One embodiment includes a method and system for authenticating a user of a service. The method may include maintaining a database on a network, where the database includes a name, electronic message address, and telephone number of a user. In a first electronic communication to an electronic message address associated with the user as stored in the database, a personal identification number may be sent. The user may be called at a telephone number associated with the user as stored in the database. The user may be queried for a least a portion of the personal identification number sent in the first electronic communication. A response code from the user in response to the query may be received. A confirmation that at least a portion of the personal identification number and response code match may be performed.

In another embodiment, a method and system for verifying authenticity of an online usage of a user may include sending a message in an electronic communication to an electronic message address of a user, interactively communicating with the user a request for a response including at least a portion of the message sent to the user, and determining if a response to the request from the user matches at least a portion of the message sent to the user. The message may include a personal identification number, other code, or image. The interactive communication may be a telephone call to the user. In addition, a certification link may be provided to the user for posting on a website or within an email to enable another user to select the communication link and have authentication information of the user be provided to the other user. Such authentication information may enable the other user to have confidence that the user whose website the other user is accessing or email the other user receives is authentic and not a misrepresentation of the user by another person impersonating the user.

Still yet, another embodiment may include a method and system for providing an authentication notice on a website or email. The method may include supplying an electronic message address and interactive communication address to an authentication authority. A message may be received from the authentication authority at the electronic message address. An interactive communication may be received from the authentication authority at the interactive communication address. The user may provide a response including at least a portion of the message received from the authentication authority in response to receiving the interactive communication from the authentication authority. A notification may be received that the authentication process is completed. An indicia may be included on a website or email indicative of the user being authenticated.

BRIEF DESCRIPTION OF THE DRAWINGS

Illustrative embodiments of the present invention are described in detail below with reference to the attached drawing figures, which are incorporated by reference herein and wherein:

FIG. 3 is an illustration of an exemplary website for a user to register for authentication for usage of online services, such as a website or email;

FIG. 5 is a diagram of an exemplary interactive process for authenticating a user during the authentication process;

DETAILED DESCRIPTIONS OF THE DRAWINGS

Figure 1:
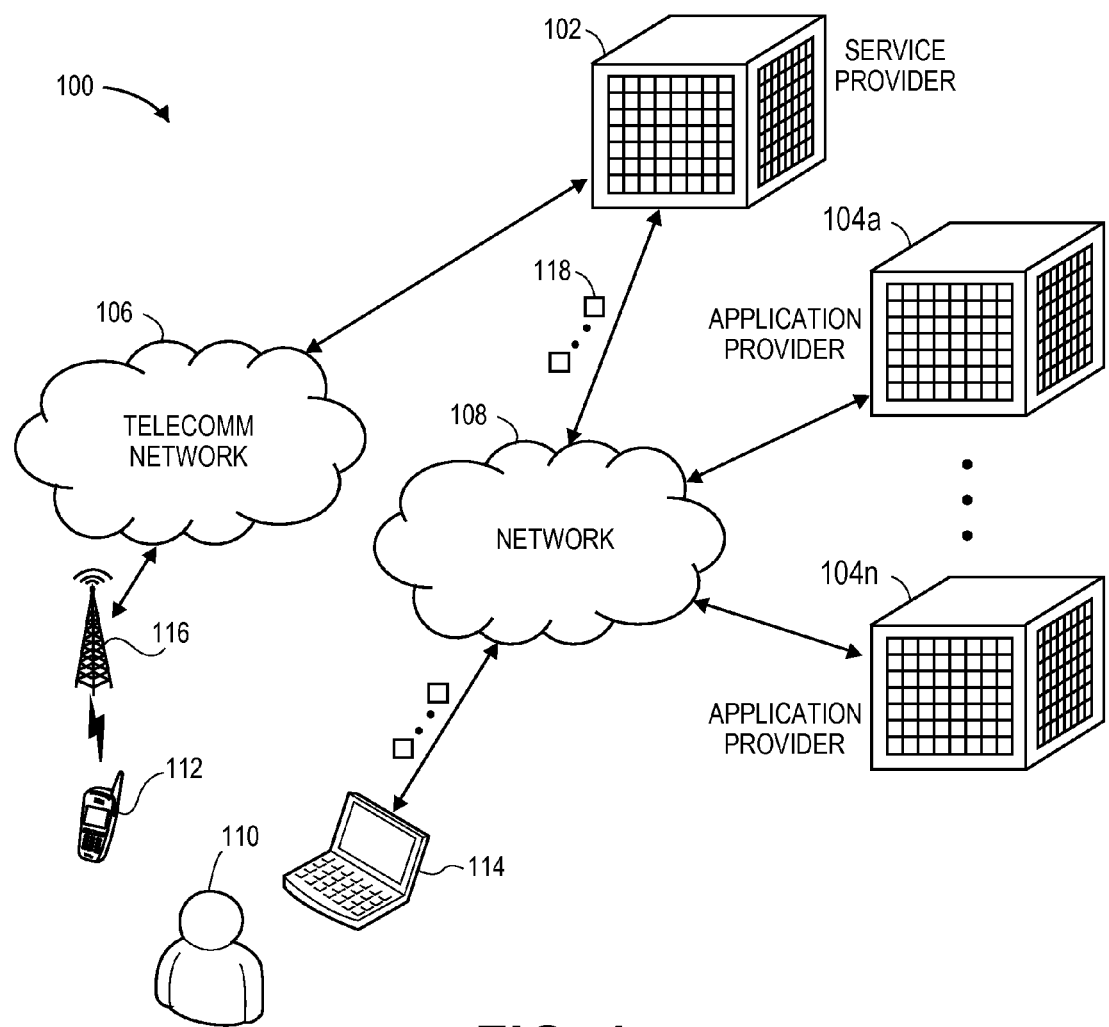
FIG. 1 is an illustration of an exemplary system for service providers and application providers to provide telecommunication and online communications to users.

FIG. 1 is an illustration of an exemplary system 100 for service providers and application providers to provide telecommunication and online communications to users. A service provider 102 may be a telecommunications service provider or other communications service provider. Application providers 104*a*-104*n* (collectively 104) may host or otherwise provide applications that users may access and utilize for a variety of purposes. The service provider 102 may provide telecommunications services that users may access over a telecommunication network 106 and provide network services that users may access over a network 108. In one embodiment, the telecommunications network 106 is a mobile telecommunications network. Alternatively, the telecommunications network 106 may be any other telecommunications network, including the public switched telephone network (PSTN) or other telecommunications network. The network 108 may be the Internet or other communications network. In accordance with the principals of the present invention, the service provider 102 may provide authentication services to users of online services, such as websites and email accounts. In other words, the service provider 102 may authenticate a user who chooses to be authenticated so that other users who access his or her website or receive emails from him or her are insured that those online activities are being conducted by the actual user 110.

In authenticating the user 110, the service provider 102 may associate an electronic message address, such as an email address, and an interactive address, such as a telephone number associated with a local telephone or mobile telephone. For example, one embodiment enables the user 110 to communicate with the service provider 102 via a mobile phone 112 and computing device 114 via the telecommunication network 106 and network 108, respectively. The mobile phone 112 communicates through a radio tower 116. The service provider 112, may communicate to an online email account (not shown) of the user 110 via data packets 118. The communication by the service provider may include a message for the user 110 to access via the computing device 114. This message may include information in which the user 110 uses to respond to a telephone call from the service provider 102. The user 110 may respond to the telephone call with information contained in the message sent to the online account of the user 110. In this way, the user 110 may be authenticated as being the owner or have access and/or control of both the email address and mobile phone 112. The authentication process is described in greater detail further herein.

Figure 2:
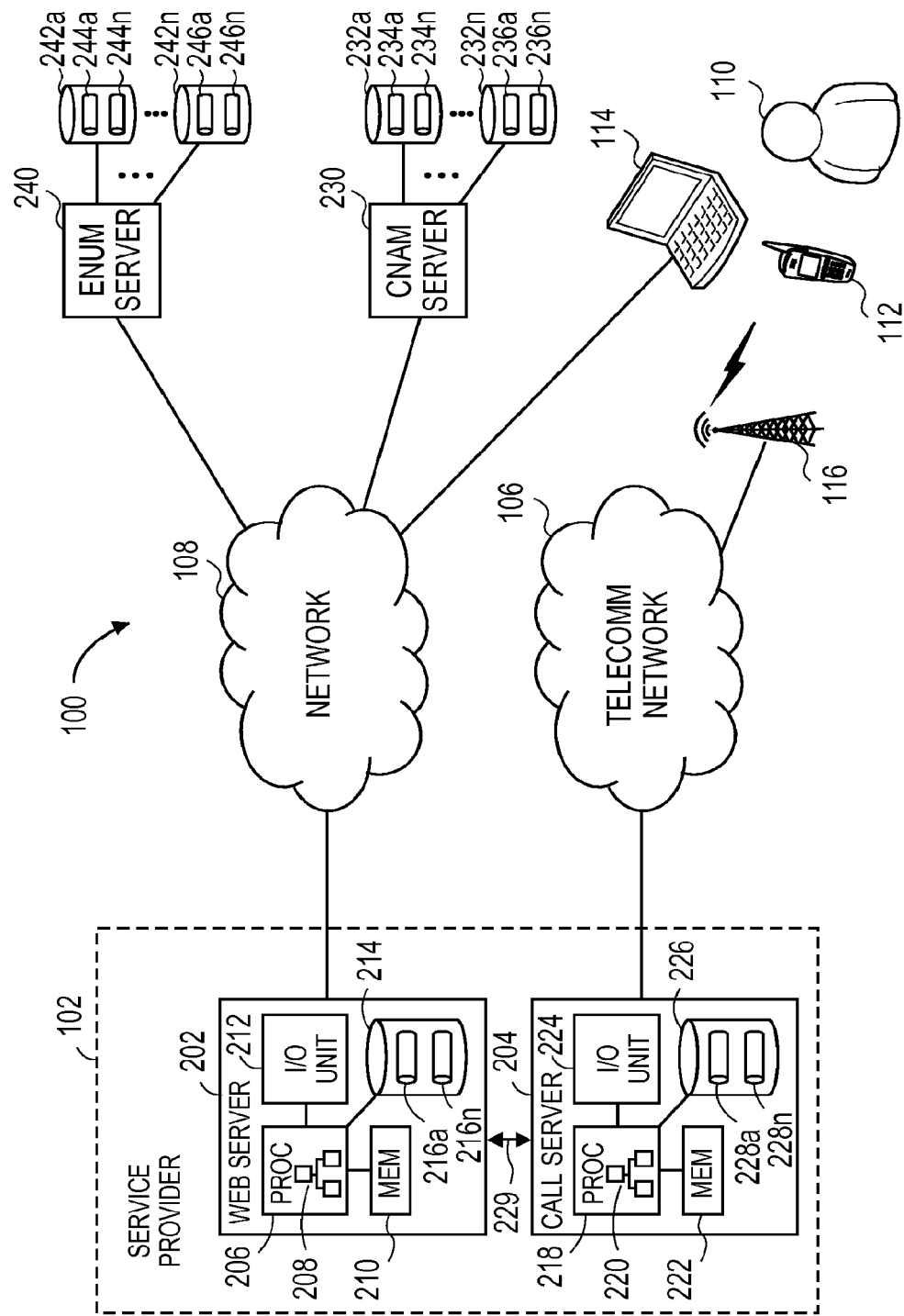
FIG. 2 is an illustration of an exemplary system for a service provider to perform authentication services for users.

FIG. 2 is an illustration of an exemplary system 100 for a service provider to perform authentication services for users. The service provider 102 may operate a web server 202 and a call server 204. The web server may include a processor 206 that executes software 208. The processor 206 may be in communication with memory 210 and input/output (I/O) unit 212 and storage unit 214. The storage unit 214 may store one or more databases 216*a*-216*n* (collectively 216). The databases 216 may include a calling name database ("CNAM") and other database(s) that may include information associated with subscribers or users of the service provider 102. Additionally, the databases 216 may include an authentication database (see TABLE I below) that stores information associated with users who are authenticated in accordance with the principles of the present invention. The software 208 may be utilized to access other databases 216 and perform communications to users in accordance with the principles of the present invention.

TABLE I is an exemplary authentication database. The database may include information associated with a user who requests authentication via a website or other interface and may be stored in a server of a service provider or elsewhere. The database may include information including an electronic message address (e.g., email address, text message address) and interactive communication address(es) (e.g., home phone number and mobile phone number). The authentication database may be accessed by both the web server 202 and call server 204, where each may look-up and write information used for the authentication process. For example, time stamps of when communications to the user's email account and telephone may be stored in the authentication database. It should be understood that other and/or different information may be included in the authentication database, including random codes for a user to respond to during an authentication telephone call to verify that the user is, in fact, human.

TABLE I

Exemplary Authentication Database

| Parameters | Users | | | |
|---|---|---|---|---|
| First Name | John | Riki | Gregory | Sharon |
| Last Name | Smith | Smith | Smith | Smith |
| Caller ID Name | John Smith | Smith Riki | Gregory Smith | Sharon Smith |
| Email address | John_Smith@hotmail.com | Rsmith@gmail.com | gregorysmith@hotmail.com | sharonsmith@msn.com |
| Home Phone No | 555-758-6611 | 555-644-6262 | 555-478-4322 | 555-874-2743 |
| Mobile Phone No | 555-405-6886 | 555-644-6036 | 555-478-3243 | 555-874-2342 |
| Mobile Phone Carrier | Sprint | Embarq | AT&T | Sprint |
| Requested Time Stamp | Aug. 26, 2006 4:05PM | Aug. 11, 2006 5:01PM | Aug. 27, 2006 3:12PM | Aug. 28, 2006 9:42AM |
| Verified Time Stamp | Aug. 26, 2006 4:45PM | Aug. 11, 2006 5:50PM | Aug. 26, 2006 4:02PM | Aug. 28, 2006 10:14AM |
| Requestor IP Address | 207.142.131.248 | 168.251.192.15 | 208.132.121.448 | 318.232.124.234 |
| Discount Code | — | — | myspace1234 | yahoo7482 |
| Verified | Yes | Yes | Yes | Yes |
| Record Number | 123456 | 654315 | 654321 | 83423 |

TABLE I-continued

Exemplary Authentication Database

| Parameters | Users | | | |
|---|---|---|---|---|
| Profile Information | Attorney | Consultant | Actor | Engineer |
| Other | — | — | — | — |

Call server 204 may include a processor 218 that executes software 220. The processor 218 may be in communication with memory 222, I/O unit 224, and storage unit 226. The storage unit 226 may store databases 228a-228n (collectively 228). The databases 228 may include information associated with subscribers of the service provider 102. The databases 228a-228n may contain multiple tables within each database. The information associated with the subscribers of the service provider 102 may include telephone numbers and caller ID names associated with the telephone numbers of the subscribers. The software 220 may be utilized to access the databases 228 to look up telephone numbers and call the users. In addition, the software 220 may include Voxeo™ VoiceXML/IVR engine, which is a voice response system, to place calls and respond to responses by users, as understood in the art.

A communication link 229 may provide communications between the web server 202 and call server 204 to enable the processors 206 and 218 executing software 208 and 220, respectively, to communicate via the I/O units 212 and to 224 to coordinate with one another in providing authentication services in accordance with the principles of the present invention. A mail server (not shown) may be in communication with the web server 202 for performing email services to users. Alternatively, the web server 202 may perform email communication services.

A calling name server 230 may be in communication with the web server 202 via the network 108. The calling name server 230 may further be in communication with storage units 232a-232n (collectively 232) that store databases 234a-234n (collectively 234) and 236a-236n (collectively 236), respectively. The databases 234 and 236 may be calling name databases that are maintained by other service providers with their subscribers' information. It should be understood that there may be one or more CNAM servers 230 associated with each service provider and their subsidiaries and the web server 202 may interact with each of the CNAM servers 230 to access the CNAM databases 234 and 236. It should be understood that access to the CNAM databases 234 and 236 may be provided by each of the service providers for a charge or for no charge depending upon sharing agreements of the CNAM databases and the contents stored therein.

An electronic number ("ENUM") server 240 may also be in communication with the network 108. One ENUM database is managed by a company NeuStar®, as understood in the art. The ENUM server 240 may be in communication with storage devices 242a-242n that stored databases 244a-244n (collectively 244) and databases 246a-246n (collectively 246) that store telephone number mapping information for service providers and subscribers.

In operation, the software 208 being executed by the processor 206 of the web server 202 may be used to host a website (see FIG. 3) to enable users to authenticate users who post websites and send email messages. It should be understood that users who use or provide other online services may be authenticated. The software 208 may further operate to manage the authentication process, including the coordinating with the call server 204 in providing the authentication process. Although the service provider 102 is shown to operate a web server 202 and call server 204, it should be understood that these servers are exemplary and that depending on the type of communication being used to authenticate a user that the servers may be other types of servers, including instant messaging servers, text messaging servers, or any other types of communication servers in replace of or in addition to the web server 202 and call server 204. In the event that other types of servers are utilized, one or more of the servers may act as a controller for coordinating the authentication process as further described herein.

FIG. 3 is an illustration of an exemplary website 300 for a user to register for authentication of online services, such as a website or email. A webpage displayed by a browser as understood in the art may include a number of text input fields for a user to enter information related to him or herself. The text input fields may include a number of required, as shown with "*", and optional input fields. It should be noted that these "required" input fields are for exemplary purposes only. The input fields may include name 302, email address 304, mobile telephone number 306, carrier name 308. The email address and mobile telephone number are electronic message addresses. Other electronic message addresses, such as a paging address, may be utilized as well. As shown, the email address and the mobile telephone number are alternatives from one another. The mobile telephone number enables a text message to be sent thereto and a carrier name (e.g., Sprint-Nextel) may be selected via a pull-down menu or otherwise. The carrier is input because text messaging to subscribers of each carrier uses a different address. For example, a text message to a Sprint telephone number has the format of 8005551212@messaging.srintpcs.com. One embodiment enables the mobile phone number to be entered and the system may look up which carrier services the number and may determine the text message for that carrier. It should be understood that any electronic message address may be utilized in accordance with the principles of the present invention. Of course, if an email address is to be authenticated, then the email address is the most logical candidate of electronic message address to be used.

A telephone number text input field 310 is provided for a user to enter his or her telephone number. The telephone number may be a home phone number, a mobile telephone number, Internet Protocol (IP) phone number, or other interactive communication address. For example, rather than using a telephone number, an instant message (IM) address may be entered. If a telephone number is used, then a caller ID name may be entered into a text input field 312. The caller ID name associated with the telephone number may be an exact caller ID name or a partial caller ID name and confirmed via the authentication system. No matter what interactive communication address is used, the authentication system has the ability to correspond an online address, which may be set up without identification verification, with a real-world, physical device of which a user owns, controls, and has possession. For example, the owner of an email address and telephone number has access and control of both and can therefore be authenticated via separate, yet corresponding, communications to each.

In addition, if the authentication service is to cost money, then a credit card number and expiration dates text input fields 314a and 314b may be provided. Alternatively, a link to an online payment service, (e.g., Paypal) may be provided. If the authentication service is to be paid for by a service provider 102 (FIG. 1) or application provider 104 (e.g., myspace.com), then a discount code text entry field 318 may be provided so that the user being authenticated does not have to pay money, but rather the third party pays the money for the authentication process. In one embodiment, if the user pays for the authentication, then a fee of $5.00, for example, may be charged. Alternatively, if a third party pays for the authentication process, then a fee of $1.00, for example, may be charged to the third party, where the lower rate reflects the higher volume provided by the third party.

In addition to the contact information that is used by the authentication system for authenticating a user, the user may also enter profile information in a profile region 320 of the webpage 300. The profile information may be helpful in allowing other users to confirm whether the authenticated user is the correct user. For example, an age input field 322, city input field 324, home page input page 326, profession input field 328, and comments input field 330 may be provided so that the user may allow others to confirm that this is indeed the correct user as particular information may be unknown to an imposter. To avoid personal security problems, the profile information is relatively non-descript in terms of providing personal information that can be used for locating a person, such as a home address.

The information entered in the authentication registration webpage 300 may be stored in a database 216a (FIG. 2) on the web server 202 for the service provider 102. During the authentication process, this information may be accessed and used for communications to the user as described further herein. It should be understood that anyone with access to the Internet may access and use the system and methodologies described herein and that the users may not be limited to subscribers of a particular service provider.

Figure 4:
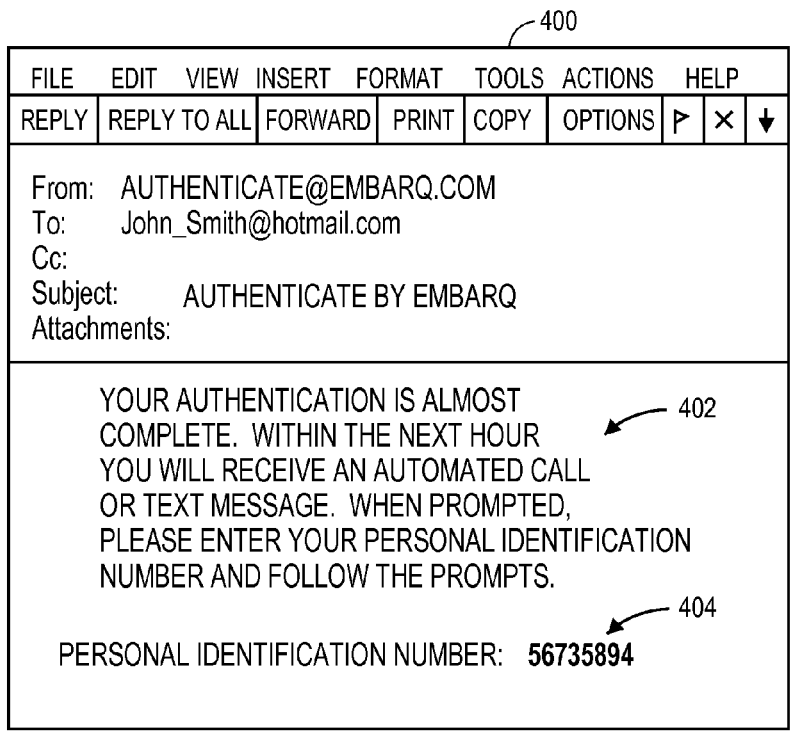
FIG. 4 is an illustration of an exemplary email communicated to a user during the authentication process.

FIG. 4 is an illustration of an exemplary email 400 communicated to a user during the authentication process. As shown, an email message 402 communicated from an authentication administrator, such as service provider 102, is communicated to the user at his or her email address (e.g., john_smith@hotmail.com) as entered in the email address text input field 304 on the authentication registration webpage 300 (FIG. 3). The text message may include a personal identification number 404 or other code that may be alpha-numeric for entry into a communication device, such as a telephone. Alternatively, rather than providing a personal identification number or other code, a picture or other image may be sent in the email 400 that the user may use for responding to a telephone call during the authentication process. For example, an image showing an animal, such an elephant, may be sent to the user and the user identifies the type of animal received in the email in response to a telephone call from the authentication system.

FIG. 5 is a diagram of an exemplary interactive process 500 for authenticating a user during the authentication process. As shown, a number of different devices and communication points are provided. The devices may include a web server 502, call server 504, ENUM server 506, CNAM 508, user 510 who is online or using an email account, user phone 512, and third-party user 514. It should be understood that different and/or other contact points may be utilized in accordance with the principles of the present invention.

Continuing with FIG. 5, the process starts at step 516, where a user 510 accesses the web server 502. At step 516, the user 510 performs an authentication registration via the web server 502 of a service provider. The authentication registration may be performed on a webpage, such as that shown in FIG. 3, that allows the user 510 to enter an electronic message address (e.g., email address, text message address, or other electronic message address) and an interactive communication address (e.g., telephone number, IM address, and IP telephone address). Other information as described with respect to FIG. 3 may be entered into the authentication registration webpage. At step 518, the web server 502 may email a message, including a personal identification number, code, or other indicia, such as an image, to the user 510 at his or her email account. Alternatively, the message may be communicated to any other electronic message address as entered by the user.

At step 519, the web server 502 may notify the call server 504 to initiate an authentication call. In response, the call server 504 may call the user phone 512 at step 520. This call may be placed within a time range or at a time specified on the email message to the user email account 510. For example, the phone call may be made within one hour of the email being sent to the user 510 at his or her email account. It should be understood that a text message or other electronic communication to a different electronic message address may provide the same or similar functionality.

The call to the user at step 520 may be automated and ask for the personal identification number 404 (FIG. 4) sent in the email message 400. Alternatively, any other information that may be communicated in an email or other electronic format message to the user may be requested. In one embodiment, the automated phone call may state, "Thank you for using Embarq's authentication services! Welcome to common sense. This is an automated call for John Smith. Please answer the 8-digit pin provided in the email we sent to John_Smith@hotmail.com. At step 522, the user may respond via the user phone 512 to the call server 504. The response(s) may be performed by using a keypad of the user phone 512 or the user may speak into the user phone 512. During the call, to provide additional security, the user may be asked to enter or speak random or non-random information, such as please press the keys corresponding to the following letters "'A Z G F.'" The call server 504 may include a dual-tone, multiple frequency ("DTMF") detector for receiving and determining the keys pressed on the user phone 512 that cause a dual-tone, multiple frequency (DTMF) signal to be communicated to the call server 504. The call server 504 may additionally and/or alternatively include a speech recognition system as understood in the art to receive a voice signal response from the user in responding to the question prompted to the user during the automated call at step 520. It should be understood that steps 520 and 522 may be performed to any electronic communication device that allows for an interactive response from a user so as to help ensure authenticity that the user is, in fact, who he or she claims to be. If the call at step 520 from the call server 504 is not answered, then the call server 504 may be configured to call the user at a later time, leave a message for the user that a scheduled call-back will be performed at a particular time, or give up after a time period and an email may be sent to the user to further attempt to schedule a call time.

Figure 9:
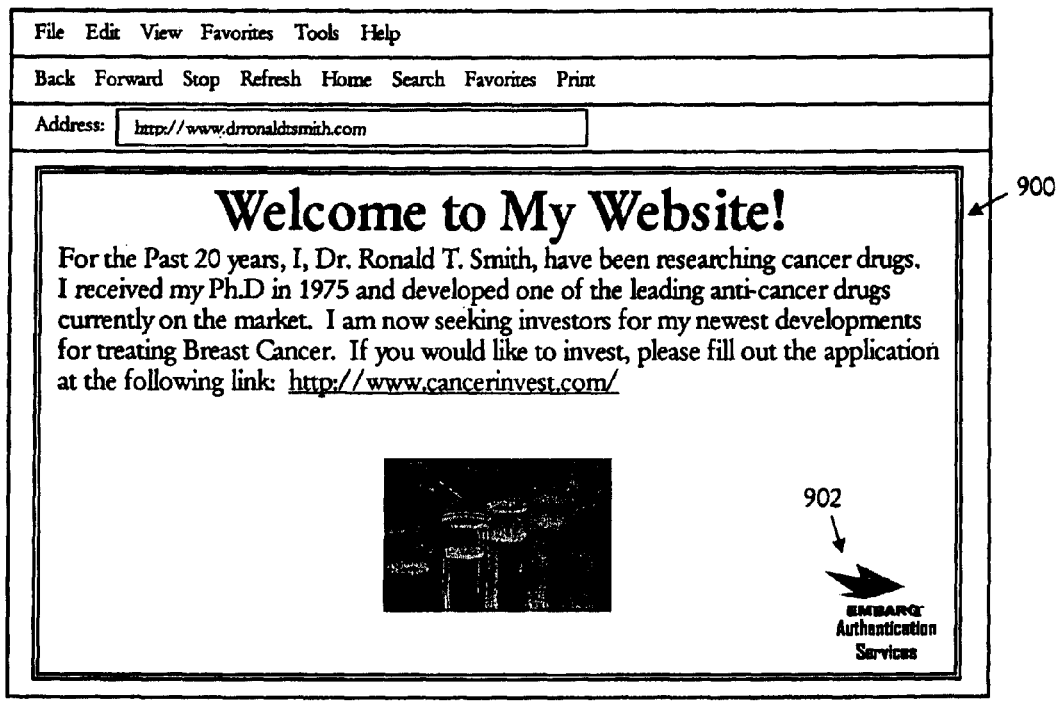
FIG. 9 is an illustration of an exemplary website including an exemplary selectable authentication symbol for visitors of the website to view and select.
Figure 10:
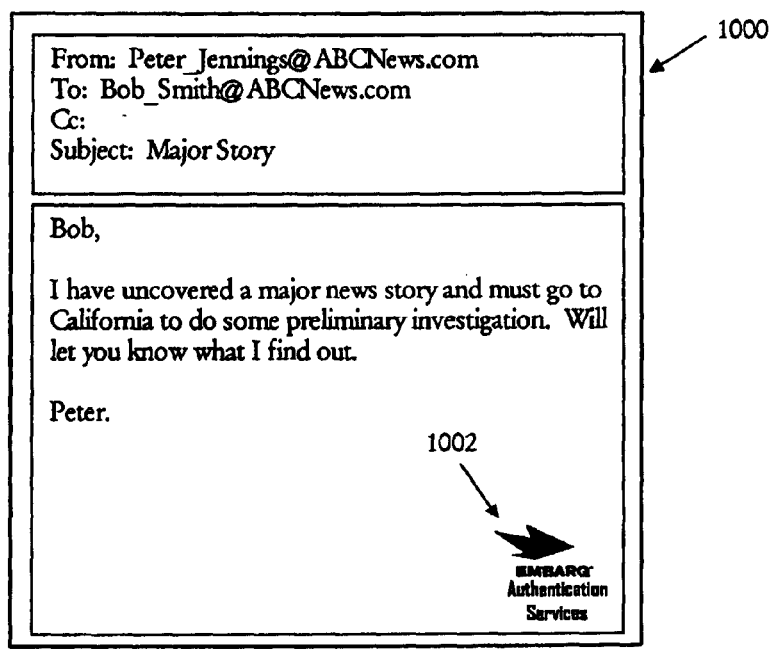
FIG. 10 is an illustration of an exemplary email including an exemplary selectable authentication symbol.

The call server 504, in response to receiving the user response at step 522, may communicate the response or information, such as an ASCII code representation of a verbal response or dual-tone, multiple frequency response from the user phone 512, to the web server 502 at step 524. The web server 502 may confirm the PIN or other response information (e.g., animal name) at step 526 to determine whether the PIN, response code or otherwise matches the PIN code or otherwise sent to the user 510 in the electronic message at step 518. At step 528, an email confirmation (see FIG. 6) may be sent to the user 510 at his or her email account indicating that the user has or has not been confirmed based on whether a match is determined at step 526. If confirmed, an authentication code may be sent to the user via an email, for example. At step 530, the user may post or place the authentication code onto a website, emails, or otherwise use in conjunction with online activities, so that other users may see the authentication code and feel secure that this user has been authenticated by a trusted authentication authority. In one embodiment, the authentication code may use the hypertext mark up language (HTML). An image, such as a logo of the authentication administrator (e.g., "Embarq Authentication Services," associated with a graphical logo) may be posted or remotely accessed and displayed on another user's display on the user's webpage or email, for example. FIG. 9 is an illustration of an exemplary website 900 including an exemplary selectable authentication symbol 902 for visitors of the website to view and select. FIG. 10 is an illustration of an exemplary email 1000 including an exemplary selectable authentication symbol 1002.

At step 532, a third-party user 514 may access a webpage of the user 510. For example, the user's online webpage may be an online community webpage (e.g., webpage) myspace.com, homepage, or other online usage. Alternatively, the third-party user 514 may receive an email from the user 510 having the authentication code placed therein. The authentication code, again, may provide the third-party user 514 with security in knowing that the user has been authenticated. For example, if a dean of a university sends out an email, students who receive the email may feel secure in that they know that the user is not another student sending out a prank email. Other numerous examples in which authentication of a user is desired are understood. At step 534, the third-party user 514 may verify the authentication of the user by clicking on the authentication code, represented as an image or otherwise, posted in the email or placed on the website. The user may be automatically directed to the web server 502 in response to clicking on the authentication code. Alternatively, the third-party user 514 may access the web server 502 to access a webpage (see FIG. 7) to perform the verification of the email address or other identifier of the user posted on a website or placed within an email or otherwise. At step 536, the web server 502 communicates an authentication verification code to the third-party user 514 to let the third-party user 514 know that the user whose email address or otherwise that the third-party user 514 is concerned about has been authenticated.

Figure 6:
FIG. 6 is an illustration of an exemplary email for notifying a user that he or she has been authenticated by an authentication process.

FIG. 6 is an illustration of an exemplary email 600 for notifying a user that he or she has been authenticated by an authentication process. As shown, a message 602 may be communicated to the user indicating that the authentication process is complete after the electronic message address and electronic communication address controlled by the user have been used to authenticate the user. The message may state, for example, "Congratulations. Your email address has been verified by our system as belonging to John Smith. Websites and visitors may visit "http://www.embarq.com/verify" to validate your email address belongs to you. This authentication will expire in six months. You may place the following authentication code on your websites and emails so others may verify your identity and email you from the web."

Again, the authentication code in the form of HTML or otherwise may be provided to the user. This code is to be unique with respect to the user so that other users attempting to verify the authentication of the user can do so.

Figure 7:
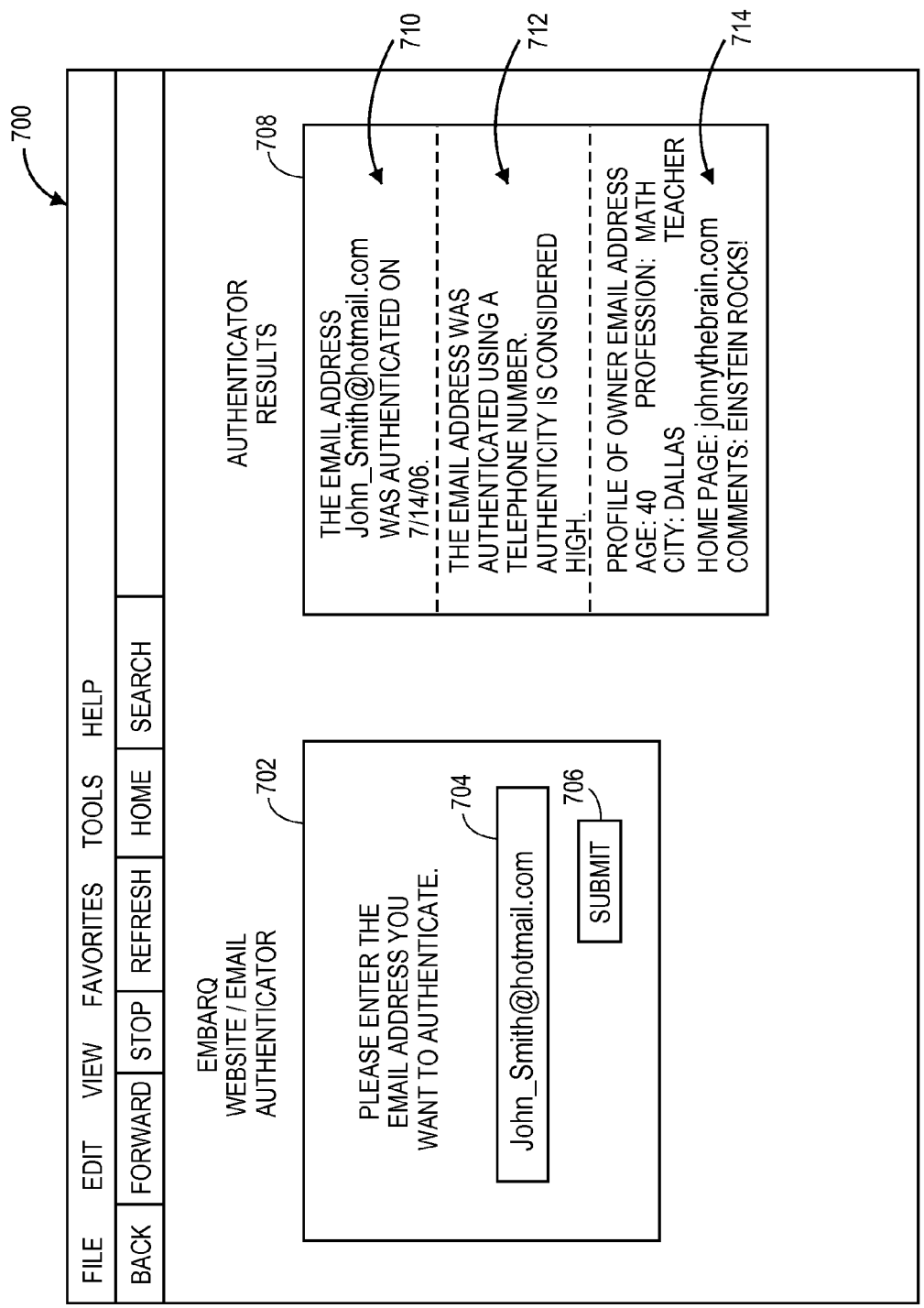
FIG. 7 is an illustration of an exemplary webpage for verifying the authenticity of an email address associated with a user that has been authenticated.

FIG. 7 is an illustration of an exemplary webpage 700 for verifying the authenticity of an email address associated with a user that has been authenticated. The webpage 700 may notify a third-party user that he or she is interfacing with a website/email authenticator. On the website 700, a region 702 may request an email address, other electronic address, or other indicia to be entered into a text input field 704. For example, the third-party user may enter John_Smith@hotmail.com into the text input field 704. Alternatively, if the third-party user selects the authentication code, the email address may automatically be posted into the text input field 704 or a process may automatically start to verify the authenticity of the user without the email address being posted on a text input field. The third-party user may select a "submit" soft-button 706 to submit the email address entered into the text input field 704. Software, which may operate as an authenticator, may be executed by a processor (e.g., processor 206 of FIG. 2) to look up in a database whether or not the email address entered into the text input field 704 corresponds to a particular user.

The webpage 700 may include another region 708 to show results of the authenticator. As shown in a text field 710, the authenticator may notify the third-party user that the email address entered into the text input field 704 has been authenticated on a particular date. Further in the text field 712, the authenticator may notify the third-party user how the authentication process performed the authentication and the reliability that the user is authentic (e.g., "high reliability"). Another text field 714 may include profile information as entered by the user into the authentication registration webpage 300 (FIG. 3). Such profile information may give added confidence to the third-party user that the person who was authenticated was indeed the actual person they were expecting.

Figure 8:
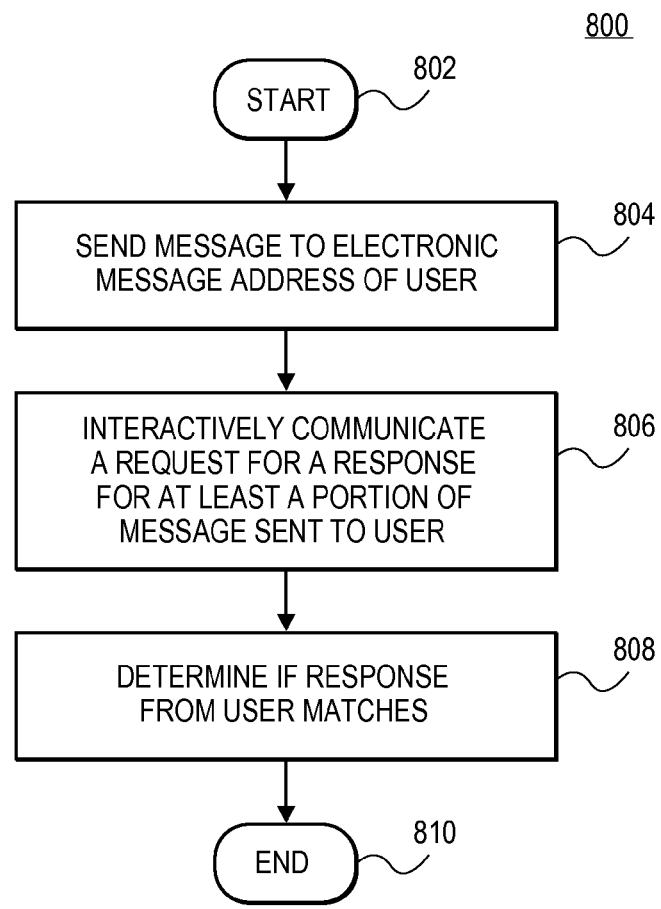
FIG. 8 is a flow diagram of an exemplary process for authenticating a user.

FIG. 8 is a flow diagram of an exemplary process 800 for authenticating a user. The process 800 starts at step 802. At step 804, a message is sent to an electronic message address of a user wanting to become authenticated. At step 806, an interactive communication with the user is made requesting a response for at least a portion of the message sent to the user. For example, the portion of the message may be a PIN number that is being requested from the user. The interactive communication may be performed via a telephone requesting that the user type the response into the keypad of the telephone or speak a response into the microphone of the telephone. Alternatively, the interactive communication may be to an IP telephone, instant message address, or otherwise, and the user may respond as available from the respective technology. At step 808, a determination is made if the response from the user matches the portion of the message for which the system requested. For example, a comparison of the response to the PIN number sent to the user in an email message may be performed. Alternatively and/or additionally, a comparison of another code, image, or otherwise may be performed. In one embodiment, more than one portion of the message may be requested from the user to improve security. Other types of questions may be asked of the user to ensure that the user is, in fact, human, and has a personal knowledge of facts unknown to anybody other than that particular user. The process ends at step 810.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for authenticating a user of an online service, said method comprising:

registering the user by requesting the user's name, email address, telephone number, age, city, homepage, profession and comments and storing the name, email address, telephone number, age, city, homepage, profession and comments in a database on a network;

accessing the database;

sending, in a first electronic communication to the email address associated with the user as stored in the database, an image;

placing a first call to the user at a telephone number associated with the user as stored in the database;

in response to receiving no answer to the first call at the telephone number associated with the user, leaving a message informing the user of a particular time for a scheduled call-back and placing a second call to the user at the telephone number associated with the user at the particular time;

in response to the user answering at least one of the calls, requesting from the user an identity of an object in the image that was sent to the email address in the first electronic communication to the user;

receiving a response from the user in response to the request;

storing, in the database, a time stamp of the at least one of the calls to the user at the telephone number associated with the user;

confirming the user is authentic based on confirming that the response includes the identity of the object in the image;

enabling a third party to verify the authenticity of the user by providing a verification webpage with an electronic entry form including an entry field for the third party to submit the email address of the user; and matching an email address received via the verification webpage with the user in the database and presenting to the third party, via the webpage, the user's name, age, city, homepage, profession, and comments received during the registration process, and further presenting to the third party an authentication date, authentication method, and a level of reliability of the authentication.

2. The method according to claim 1, further comprising sending a verification code in a second electronic communication to the email address.

3. The method according to claim 2 wherein the electronic entry form includes a field for receiving the verification code from the third party, and wherein at least one of the email address and the verification code is matched with the user in the database.

4. The method according to claim 1, wherein receiving includes receiving a signal in the form of a voice signal.

5. The method according to claim 1, wherein receiving includes receiving a signal in the form of an ASCII text.

6. The method according to claim 1, further comprising providing users with an electronic input form for entry of user information for use in performing an authentication, the input form including name, email address, and telephone number text entry fields.

7. The method according to claim 6, wherein providing users with an electronic input form includes providing a caller ID text entry field.

8. The method according to claim 7, further comprising verifying that a caller ID received from a user matches at least in part a caller ID associated with the telephone number.

9. The method according to claim 1, further comprising providing a certification link to the user in response to confirming that the response includes the identity of the object in the image.

10. The method according to claim 9, wherein providing the certification link enables the user to include the certification link on a website.

11. The method according to claim 1, further comprising:
prompting the user with random information; and
confirming that the user submits the random information in response to the prompt.

12. A system for authenticating a user of an online service, such system comprising:

a database in communication with a network; and at least one processor executing software, said at least one processor in communication with said database and the software configured to:

register the user by requesting the user's name, email address, telephone number, age, city, homepage, profession and comments and storing the name, email address, telephone number, age, city, homepage, profession and comments in a database on a network;

send an image in a first electronic communication to the email address associated with the user as stored in the database;

place a first call to the user at a telephone number associated with the user as stored in the database;

in response to receiving no answer to the first call at the telephone number associated with the user, leave a message informing the user of a particular time for a scheduled call-back and place a second call to the user at the telephone number associated with the user at the scheduled call-back time;

in response to the user answering at least one of the calls, request from the user an identity of an object in the image sent in the first electronic communication to the user;

receive a response from the user in response to the request;

store, in the database, a time stamp of the at least one of the calls to the user at the telephone number associated with the user;

confirm the user is authentic by confirming that the response includes the identity of the object in the image;

enable a third party to verify the authenticity of the user by providing a verification webpage with an electronic entry form including an entry field for the third party to submit the email address of the user; and match the email address with the user in the database and present to the third party, via the webpage, the user's name, age, city, homepage, profession and comments, and further present to the third party an authentication date, authentication method, and a level of reliability of the authentication.

13. The system according to claim 12, wherein the software is further configured to send a verification code in a second electronic communication to the email address.

14. The system according to claim 12, wherein the electronic entry form includes a field for receiving the verification code from the third party, and wherein the software matches at least one of the email address and the verification code with the user in the database.

15. The system according to claim 12, wherein the software is further configured to receive the verification code as a signal in the form of a voice signal.

16. The system according to claim 12, wherein the software is further configured to provide users with an electronic input form for entry of user information for use in performing an authentication, the electronic input form including name, email address, and telephone number text entry fields.

17. The system according to claim 16, wherein the software is further configured to provide users with an electronic input form further including providing a caller ID text entry field.

18. The system according to claim 17, wherein the software is further configured to verify that a caller ID received from a user at least in part matches a caller ID associated with the telephone number.

19. The system according to claim 12, wherein the software is further configured to provide a certification link to the user in response to confirming a match of at least a portion of the personal identification number and response code.

20. The system according to claim 12, wherein the software is further configured to provide a communication link that enables a user to include the communication link on a website or email.

21. The system according to claim 12, wherein the software is further configured to:
  prompt the user with random information; and
  confirm that the user submits the random information in response to the prompt.

\* \* \* \* \*